Patented May 18, 1954

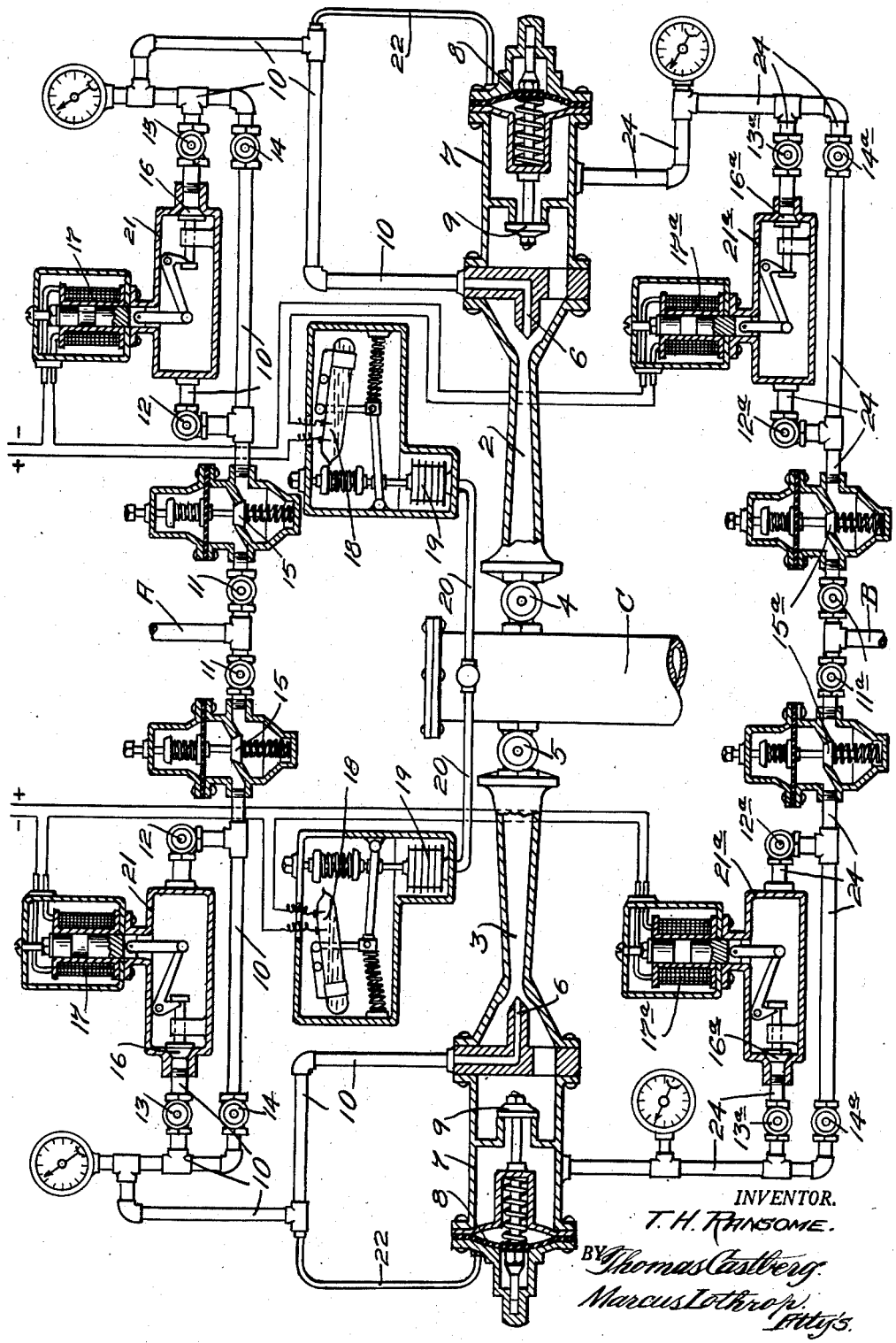

2,678,877

UNITED STATES PATENT OFFICE 2,678,877

APPARATUS FOR PRODUCING COMBUSTIBLE GASEOUS MIXTURES OF SUBSTANTIALLY CONSTANT PRESSURE

Tallent H. Ransome, Oakland, Calif.

Application August 24, 1951, Serial No. 243,532

8 Claims. (Cl. 48—184)

This invention relates to an apparatus for the manufacture of combustible gaseous mixtures, and especially to improvements in the apparatus shown in my former Patent No. 2,342,426 issued February 22, 1944.

Where hydrocarbons of the methane series, such as butane, propane, etc. or a mixture of such gases are employed, the B. t. u. or calorific value is ordinarily too high for most uses and a diluent, in the form of air or other gases must accordingly be mixed with the gas to insure proper combustion.

My former patent above referred to discloses an apparatus for manufacturing such a dilute mixture of gases, and for controlling the B. t. u. content and pressure of the gases, but the apparatus is limited to a low pressure system, while the apparatus disclosed in this application is particularly designed for both high and low pressure systems.

The object of the present invention is to provide an apparatus of the character described which is suitable both for high and low pressure systems; to provide an apparatus which will maintain a gaseous mixture at a substantially constant B. t. u. value and at a substantially constant pressure whether high or low; to provide an apparatus which is automatic in operation; to provide an apparatus which is capable of large capacity production of diluted gases; and further to provide a mixing valve which is simple in construction and dependable in operation.

The apparatus is shown by way of illustration in the accompanying drawing, which is a diagrammatic view showing the assembly and arrangement of the apparatus employed.

Referring to the drawing in detail A indicates a gas supply pipe, B a compressed air supplying pipe and C a main or service pipe into which a mixture of gas and air is to be introduced. Connected to the service main are a pair of Venturi tubes 2 and 3 and positioned between the Venturi tubes and the service main are shut off valves 4 and 5 which are normally open. Disposed at the inner or throat end of each Venturi tube is a gas nozzle 6, and disposed behind each nozzle is a housing 7 in which is mounted a flexible diaphragm 8 and a valve 9 which is controlled by the diaphragm. Gas is supplied to the nozzles 6 by pipes 10 which carry valves 11—12—13 and 14, the pipes 10 also carry pressure regulating valves 15 and solenoid actuated valves 16. Solenoid magnet coils which acuate valves 16 are indicated at 17. The coils are controlled by mercoid electric switches indicated at 18 and these are actuated by bellows tubes 19 which are connected with the service main C by pipes 20.

Where butanes or a like gas is employed as the source of fuel, it will usually be stored in a tank under a pressure of 90 lbs. or so, said pressure being maintained either by heat or the application of compressed air. Under such a pressure the butane will be in liquid form. When drawn from the tank it will pass through heat exchangers, not here shown, and will thus be delivered to the pipe A at a sufficiently high temperature to maintain it in a gaseous form when entering the pressure reducing valves indicated at 15. At this point the pressure drop is considerable and as the gas is used almost immediately thereafter, further heat application is usually unnecessary, but if it should be necessary, it could obviously be employed. The tank or source of fuel supply, heat exchangers, etc. are not shown, as standard equipment of this character may be employed.

If a pressure of 50 lbs. gauge is to be maintained in the service main the pressure regulating valves 15 will be adjusted to 50 lbs. hence, gas will flow under that pressure through the valves 11—15 and 12 into housings 21 which carry the valves 16, as valves 14 are normally closed. If valves 16 are open the flow continues through valves 13 and pipes 10 to the nozzles 6. By-pass pipes 22 connect the rear sides of the diaphragms 8 with pipes 10, hence, when gas is flowing valves 9 will open and compressed air from pipes 24 will enter and mix with the gas from the nozzles 6; this mixture finally passing through the Venturi tubes and the valves 4 and 5 into the service main. Compressed air from any suitable source is delivered to pipe B. This pipe is connected with the pipes 24 and pipes 24 carry pressure regulating valves 15ª and solenoid actuated valves 16ª similar to the valves 11 and 16 heretofore described. Coils 17ª of the solenoid actuated valves 16ª are connected in series with the coils 17, hence, when the pressure in the service main reaches 50 lbs. the bellows tubes 19 will expand and trip the mercoid tubes to the position shown in the drawing, thereby breaking the electric circuit through the coils causing valves 16 and 16ª to close simultaneously and shut off flow of gas and air.

Due to the fact that there is an injector action where the gas enters the throat ends of the Venturi tubes it is possible to carry the air at a lower pressure than the gas, thus while the gas delivered by pipe A enters at around 90 lbs. pressure and is reduced by valves 11 to 50 lbs., air may be delivered to pipe B at 50 lbs. or less and will be reduced by valves 15ª to about 45 lbs. This is important as it results in a large saving in the power required to operate the air compressors not shown.

While only two Venturi tubes are shown, it is obvious that a plurality of pairs of Venturi tubes may be connected with the service main, and that the pipes 10 and 24 may be extended to connect with all of them, hence, any capacity or demand on the service main may be readily taken care of. The number of pressure regulating valves 15 employed need not be increased, but the number of mercoid switches and solenoid actuated valves employed may be increased. Where the demand on the service main fluctuates to the extent that it may be heavy at certain times and comparatively nill at other times, it is desirable that certain bellows tubes actuate their associated mercoid switches at lower pressures than others, for instance, the demand on the service main may be so sudden and great that the pressure therein may drop to 45 lbs. this will mean that a bellows tube set for 45 lbs. will trip its associated mercoid switch at that pressure, while another bellows tube will trip at 46 lbs. and so on. The tripping of course, taking place in a reverse direction, that is, the bellows tube set for the highest pressure will trip first and those set for the lowest pressure last. In the drawing here presented, the bellows tube shown on the right-hand side of the service main may be set to trip its switch when the pressure in the main drops to 49 lbs. while the bellows tube shown on the left-hand side of the service main may be set to trip at 48 lbs.

The apparatus shown is automatic in operation. The bellows tubes 19 and the mercoid switches and valves actuated thereby maintains a substantially constant pressure in the service main. The B. t. u. content of the gas in the service main or in other words the ratio of gas to air may be regulated by the valves 12 and 12ª and once determined is automatically maintained.

While the apparatus shown is particularly intended for high pressure systems it may also be used for low pressure systems, for instance, where the pressure maintained in the main is 5 lbs. gauge or less. In that case, pipe B and pipes 24 together with the pressure reducing valves 15ª and the solenoid actuated valves 16ª may be entirely eliminated. Instead thereof, an air filter or screened fitting not shown is connected to the housings 7 at the points where the pipes 24 were formerly connected. Due to the injector action of the gas nozzles into the throats of the Venturi tubes, air under atmospheric pressure enters and mixes with the gas, the B. t. u. content being controlled by varying the pressure and volume of gas discharging from the nozzles, and while these and other features of the invention have been more or less specifically described and illustrated, I wish it understood that changes may be resorted to within the scope of the appended claims, and that the materials and finish of the valves and other parts of the apparatus employed may be changed to suit varying conditions and demands.

Having thus described my invention what I claim and desire by Letters Patent is:

1. In a gas mixing apparatus of the character described, an aspirator, means for delivering gas at a pressure above five pounds gauge to the aspirator, means for delivering compressed air above atmospheric pressure to the aspirator, a service main into which the aspirator discharges, means for varying the ratio of gas and air, means for maintaining said air at a lower pressure than the gas, and means actuated by the pressure in the main for shutting off or opening flow of gas and air to the aspirator.

2. In a gas mixing apparatus of the character described, an aspirator, means for delivering gas at a pressure above five pounds gauge to the aspirator, means for delivering compressed air above atmospheric pressure to the aspirator, a service main into which the aspirator discharges, means for varying the ratio of gas and air, means for maintaining the gas at a predetermined pressure, means for maintaining the compressed air at a predetermined pressure lower than the gas pressure, and means actuated by a drop in pressure in the main below a predetermined pressure for opening a flow of gas and air to the aspirator said means closing the flow of gas and air when the predetermined pressure is restored.

3. In a gas mixing apparatus of the character described, an aspirator, means for delivering gas at a pressure above five pounds gauge to the aspirator, means for delivering compressed air above atmospheric pressure to the aspirator, a service main into which the aspirator discharges, means for varying the ratio of gas and air, and means actuated by the pressure in the main for simultaneously shutting off or opening flow of gas and air to the aspirator.

4. In a gas mixing apparatus of the character described, an aspirator, means for delivering gas at a pressure above five pounds gauge to the aspirator, means for delivering compressed air above atmospheric pressure to the aspirator, a service main into which the aspirator discharges, means for varying the ratio of gas and air, means for maintaining the gas at a predetermined pressure, means for maintaining the compressed air at a predetermined pressure lower than the gas pressure, and means actuated by a drop of pressure in the main below a predetermined pressure for simultaneously opening a flow of gas and air to the aspirator said means closing the flow of gas and air when the predetermined pressure is restored.

5. In a gas mixing apparatus of the character described, a Venturi tube, a housing connected with the throat end of the tube, a gas service main connected with the discharge end of the tube, a nozzle in the housing aligning with the throat of the tube, means for delivering compressed air above atmospheric pressure to the housing, a valve in the housing to shut off or open flow of compressed air to the throat of the Venturi tube, means actuated by a drop of pressure in the service main below a predetermined pressure for delivering gas at a pressure above five pounds gauge to the nozzle, means for varying the ratio of gas and air and means actuated by flow of gas to the nozzle for opening the valve to permit simultaneous flow of gas and air to the throat of the Venturi tube.

6. In a gas mixing apparatus of the character described, a Venturi tube, a housing connected with the throat end of the tube, a gas service main connected with the discharge end of the tube, a nozzle in the housing aligning with the throat end of the tube, means for delivering compressed air above atmospheric pressure to the housing, a valve in the housing to shut off or open flow of compressed air to the throat of the Venturi tube, means actuated by a drop of pressure in the service main below a predetermined pressure for delivering gas at a pressure above five pounds gauge to the nozzle, means for maintaining the compressed air at a lower pressure than the gas, means for varying the ratio of gas and air and means actuated by flow of gas to the nozzle for opening the valve to permit simultaneous flow of gas and air to the throat of the Venturi tube.

7. In a gas mixing apparatus of the character described, a Venturi tube, a housing connected with the throat end of the tube, a gas service main connected with the discharge end of the tube, a nozzle in the housing aligning with the throat end of the tube, an air inlet formed in the housing, a valve in the housing to shut off or open flow of air through said inlet, means actuated by a drop in pressure in the main below a predetermined pressure for delivering gas above atmospheric pressure to the nozzle, a diaphragm in the housing, said diaphragm being connected with the valve to open or close the same, and means for directing gas above atmospheric pressure to one side of the diaphragm to open the valve when gas is delivered to the nozzle so that gas and air will simultaneously enter the throat of the Venturi tube.

8. In a gas mixing apparatus of the character described, a Venturi tube, a housing connected with the throat end of the tube, a gas service main connected with the discharge end of the tube, a nozzle in the housing aligning with the throat end of the tube, an air inlet formed in the housing, a valve in the housing to shut off or open flow of air through said inlet, means actuated by a drop in pressure in the main below a predetermined pressure for delivering gas above atmospheric pressure to the nozzle, a diaphragm in the housing said diaphragm being connected with the valve to open or close the same, means for directing gas above atmospheric pressure to one side of the diaphragm to open the valve when gas is delivered to the nozzle so that gas and air will simultaneously enter the throat of the Venturi tube, and means for maintaining the gas at a predetermined pressure.

References Cited in the file of this patent

UNITED STATES PATENTS

| Number | Name | Date |
| --- | --- | --- |
| Re. 22,556 | Heller | Oct. 24, 1944 |
| 2,342,426 | Ransome | Feb. 22, 1944 |
| 2,570,373 | Peacock | Oct. 9, 1951 |